(12) United States Patent
Callender et al.

(10) Patent No.: US 10,719,963 B2
(45) Date of Patent: Jul. 21, 2020

(54) GRAPHICAL USER INTERFACE MAP FEATURE FOR A NETWORK SERVICE

(71) Applicant: Uber Technologies, Inc., San Francisco, CA (US)

(72) Inventors: James Callender, San Francisco, CA (US); Adam Share, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 16/196,267

(22) Filed: Nov. 20, 2018

(65) Prior Publication Data

US 2019/0164319 A1 May 30, 2019

Related U.S. Application Data

(60) Provisional application No. 62/591,124, filed on Nov. 27, 2017.

(51) Int. Cl.
*G06T 11/20* (2006.01)
*G06T 11/60* (2006.01)
(Continued)

(52) U.S. Cl.
CPC .............. *G06T 11/206* (2013.01); *G06T 3/40* (2013.01); *G06T 11/00* (2013.01); *G06T 11/60* (2013.01);
(Continued)

(58) Field of Classification Search
CPC ...................................................... G06T 11/60
(Continued)

(56) References Cited

U.S. PATENT DOCUMENTS 8,738,638 B1    5/2014  Koshelev
8,788,431 B1 *  7/2014  Shao ...................... G06Q 50/16
                                                    705/313
(Continued)

FOREIGN PATENT DOCUMENTS

CN        105095481       11/2015
CN        105741334        7/2016
WO     WO 2017/195095     11/2017

OTHER PUBLICATIONS

"Tiles àla Google Maps: Coordinates, Tile Bounds and Projection—conversion to EPSG:900913 (EPSG:3785) and EPSG:4326 (WGS84)". www.maptiler.org. Retrieved Oct. 15, 2015.*
(Continued)

*Primary Examiner* — Javid A Amini
(74) *Attorney, Agent, or Firm* — Mahamedi IP Law LLP

(57) ABSTRACT

A mobile computing device operated by a service provider or a user of a network-based service is configured to present a graphical user interface (GUI) map feature. The GUI map feature includes a map layer and a visual data layer for displaying one or more visual representations of service data associated with the network-based service. The mobile computing device is configured to determine a set of anchor coordinates for the GUI map feature and retrieve a set of service data based at least in part on the set of anchor coordinates. The set of service data can include a first set of service data associated with a map area to be illustrated by the GUI map feature and a second set of service data associated with a buffer area. The second set of service data can be retrieved based further on an image processing parameter.

20 Claims, 7 Drawing Sheets

(51) Int. Cl.
*G06T 3/40* (2006.01)
*H04W 4/00* (2018.01)
*G06T 11/00* (2006.01)
*G06F 3/0484* (2013.01)

(52) U.S. Cl.
CPC .......... *H04W 4/00* (2013.01); *G06F 3/04845* (2013.01); *G06T 2200/24* (2013.01)

(58) Field of Classification Search
USPC ....................................................... 345/637
See application file for complete search history.

(56) References Cited

U.S. PATENT DOCUMENTS

| | | | |
|---|---|---|---|
| 9,066,206 B2 | 6/2015 | Lin | |
| 9,412,199 B2* | 8/2016 | Hendrey | G06F 3/0481 |
| 10,050,760 B2* | 8/2018 | Ross | H04W 4/00 |
| 10,198,700 B2* | 2/2019 | Farrelly | H04L 67/306 |
| 2002/0078093 A1* | 6/2002 | Samaniego | G06F 16/9577 |
| | | | 715/202 |
| 2005/0232507 A1* | 10/2005 | Zimmer | G06T 5/20 |
| | | | 382/264 |
| 2010/0256863 A1* | 10/2010 | Nielsen | G07C 5/085 |
| | | | 701/31.4 |
| 2014/0340416 A1* | 11/2014 | Teitlebaum | G06T 11/00 |
| | | | 345/589 |
| 2014/0358603 A1* | 12/2014 | Viger | G06Q 10/08 |
| | | | 705/7.12 |
| 2017/0052747 A1* | 2/2017 | Cervelli | G06T 19/006 |

OTHER PUBLICATIONS

"Time-of-Day Pricing in Taxi Markets" Xinwu Qian and Satish V. Ukkusuri, IEEE Transactions on Intelligent Transportation Systems Jan. 2017.*

IPRP in PCT/US2018/062317 dated Aug. 19, 2019.

ISR and Written Opinion in PCT/US2018/062317 dated Feb. 26, 2019.

D. Baron, What does a blur radius mean? Jul. 11, 2017.

* cited by examiner

GRAPHICAL USER INTERFACE MAP FEATURE FOR A NETWORK SERVICE

CROSS REFERENCE TO RELATED APPLICATION

This application claims the benefit of priority to U.S. Provisional Patent Application No. 62/591,124, titled GRAPHICAL USER INTERFACE MAP FEATURE FOR A NETWORK SERVICE, and filed on Nov. 27, 2017, which is hereby incorporated by reference in its entirety.

BACKGROUND

A network service managed by a network system over one or more networks can provide services to users over a given geographic region (e.g., a metropolitan area such as San Francisco or New York City). There can be multiple service parameters associated with the network service (e.g., demand levels, price multipliers, average user wait times, etc.) that varies throughout the given geographic region. Via a service provider application executing on a service provider device, a service provider of the network service can view the service parameters associated with the network service. Similarly, a user of the network service can view such service parameters via a user application executing on a user device.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
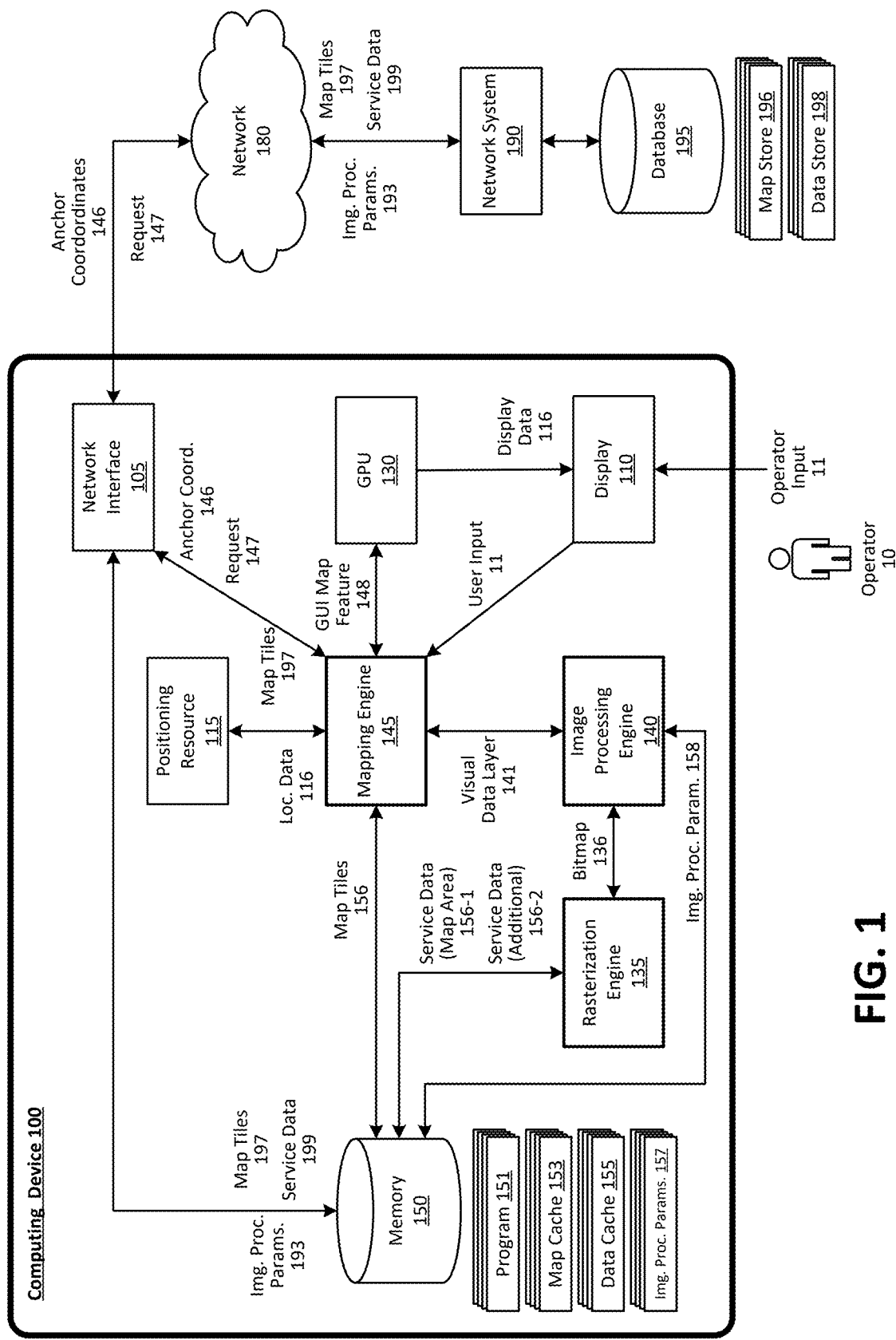
FIG. 1 is a block diagram illustrating an example computing device in communication with a network system managing a network service, in accordance with examples described herein.

A network system is provided herein that manages a network service over a given geographic region (e.g., San Francisco, New York City, etc.). Examples of the network service can include a transport service, a delivery service, a courier service, etc. To manage the network service, the network system can communicate with a plurality of mobile computing devices over one or more networks, including mobile computing devices operated by service providers ("provider devices") and mobile computing devices operated by users ("user devices"), to link available service providers (e.g., drivers, couriers, and/or autonomous vehicles (AVs)) with requesting users (e.g., riders, service requesters, etc.) throughout the service region (e.g., the given geographic region in which the network service is managed by the network system). In doing so, the network system can receive request data corresponding to requests for service from user devices via a designated user application executing on the user devices. Based on a start location (e.g., a location where the user is to rendezvous with a selected service provider) determined from a user input or from one or more geo-aware resources on the user device, the network system can identify an available service provider and transmit an invitation to the provider device of the available service provider to fulfill the service request to a service location (e.g., a location where the requested service is completed such as an end location where the service provider drops off the user).

In managing the network service, the network service can determine, collect, and/or estimate a plurality of service parameters related to the network service. The plurality of service parameters can indicate conditions or variables associated with the network service. For example, in the context of a transport service, relevant service parameters can include an expected wait time for a user (e.g., wait times for service providers to arrive at a start location), a number of active users in a given geographic area, an indicator of real-time demand, a price multiplier, etc. Values for a particular service parameter can vary by location within the service region. For instance, at a first location within service region, the expected wait time of users can be 10 minutes; while at a second location within the service region, the expected wait time of users can be 5 minutes. In certain implementations, the service region can be divided into a plurality of subdivisions (e.g., hexagonal subdivisions) each having an associated real-time service parameter value that is indicative of a condition relating to the network service within that subdivision. The service parameter values can be determined, collected, estimated, and/or updated by the network system in real-time to reflect up-to-date changes to conditions associated with the network service for each subdivision of the given region managed by the network system.

According to embodiments, the provider devices and/or user devices (collectively, "mobile computing devices" or "computing devices") can present a graphical user interface (GUI) map feature that includes a map layer and a visual data layer. The visual data layer can illustrate service parameter values of the network service over the map area to be illustrated in the GUI map feature. Thus, by interacting and viewing the GUI map feature having the visual data layer, a user or service provider can view information pertaining to service parameter values. In certain implementations, the visual data layer can be a heatmap in which data values are illustrated or represented as various colors, shades, tones, or hues. For instance, shades or tones of a color, various colors, or a combination thereof can be used to represent the values of one or more service parameters across the map area illustrated in the GUI map feature. The computing devices can overlay the visual data layer with the map layer to render the GUI map feature for presentation on a display of the computing devices. Furthermore, the GUI map feature can be dynamically updated as necessary, such as when updated service parameter values are received from the network system or when a map area illustrated in the GUI map feature changes due to a change in the device's location or by user input.

By providing, on a mobile computing device, a dynamically-updated GUI map feature that includes a visual data layer that illustrates value variations of a service parameter over a map area, embodiments described herein allow for the effective presentation, to service providers and/or users, of complex data associated with the network service that can otherwise be difficult and obtuse to interpret. By overlaying the visual data layer with the map layer, a service provider can easily interpret the significance of information relayed in the visual data layer, based on, for example, the service provider's own location relative to areas depicted in the visual data layer. In addition, the rasterization and blurring process to generate the visual data layer performed by exemplary computing devices described herein are optimized in a manner to conserve both network and processing resources. As such, the performance of such computing devices is improved. In addition, the process described herein to dynamically update the visual data layer based on adjustments in a zoom level of the GUI map feature is further optimized to reduce network traffic and overhead. In this manner, the relative performances of both the computing device and the network system, which communicates with the computing device to enable the computing device to generate or update the visual data layer, are both significantly improved.

In certain implementations, the map layer can comprise a plurality of map tiles. Similarly, a given service parameter value is associated with a corresponding subdivision within the given region of the network service. Map tiles stored within the networked database can be cataloged or organized in accordance with a coordinate system (e.g., longitude and latitude, or a custom coordinate system for the service region, etc.). Accordingly, to retrieve the appropriate map tiles and service parameter values, the computing device can first determine a set of anchor coordinates that provide an indication as to the location of the map area to be rendered on the GUI map feature. Depending on the implementation, the anchor coordinates can indicate a point of the map area to be rendered on the GUI map feature (e.g., center, lower left corner, etc.). The computing device can determine the anchor coordinates based on location data generated by a location-aware resource of the computing device (e.g., GPS, GLONASS, etc.). For example, when a service provider or a user first launches the service provider application or the user application to view the GUI map feature, the computing device can be configured to determine a set of anchor coordinates based on the current location of the computing device (e.g., using real-time GPS data). The computing device can further determine the set of anchor coordinates based on a map area displayed within the GUI map feature (e.g., based on the position of the map area relative to the service region and/or a zoom level of the GUI map feature, etc.).

In the examples described herein, the computing device can determine map tiles and service parameter values needed to render the GUI map feature. For example, the computing device (or the network system) can determine, based on the set of anchor coordinates and a zoom level, a set of map tiles needed to render the map layer of the GUI map feature, which depicts a map area that corresponds the anchor coordinates at the indicated zoom level for the GUI map feature. The set of map tiles can then be retrieved from a networked database (e.g., managed by the network system that manages the network service) or a local memory storage on the computing device to generate the map layer. Similarly, based on the set of anchor coordinates and the zoom level of the GUI map feature, the computing device can determine a set of data values (e.g., service parameter values) associated with the map area to be displayed on the GUI map feature. The set of data values can be retrieved from the network system, the networked database maintained by the network system, or local memory storage to render the visual data layer. For instance, the subdivisions (e.g., predefined hexagonal subdivision) to be displayed on the GUI map feature can be identified and their respective service parameter values can be retrieved.

In certain implementations, the computing device can retrieve additional data values (e.g., service parameter values) in addition to the data values associated with the viewable map region to be displayed in the GUI map feature. To generate the visual data layer, the computing device can be configured to perform image processing functions and the additional data values can be retrieved based at least on an image processing parameter. For example, the computing device can be configured to perform a blurring function (e.g., a Gaussian blur) to generate a smoothed heatmap as the visual data layer. In such an example, the image processing parameter to be used in performing the blurring function can be a blur radius value associated with the blurring function. Based on the blur radius value, the computing device can retrieve additional data (e.g., additional service parameter values) in addition to those associated with the viewable map area of the GUI map feature to ensure that the blurring function can be performed on the edges of the viewable map area. In certain implementations, the blur radius value can vary between different service regions. For instance, in certain markets of the network service, a larger blur radius value can be used in generating the visual data layer compared with other markets. The blur radius value used can also depend on the zoom level of the GUI map feature. The network system and/or the computing device can be configured to dynamically determine the image processing parameter.

According to some examples, the retrieved data values can be in the form of vector data and can be converted into an image (e.g., a bitmap) to generate the visual data layer. To perform this conversion, the computing device can perform rasterization using GPU resources of the computing device to create an image based on the data values (e.g., service parameter values) retrieved from the network system. Image processing functions, such as Gaussian blurring, can then be performed on the created image to smoothen features on the image.

As used herein, a computing device refers to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Descriptions

FIG. 1 is a block diagram illustrating an example computing device in communication with a network system managing a network service, in accordance with examples described herein. As described herein, a computing device 100 can be configured to generate a GUI map feature relating to the network service and presenting the GUI map feature on a display 110 for viewing by an operator 10 of the computing device. The network service can be a transport service, a delivery or courier service, etc. managed by a network system 190 over a geographic region (e.g., a service region.).

According to embodiments, the network system 190 in communication with the computing device 100 can manage a network service that connects requesting users with service providers that are available to fulfill the users' service requests. The network system 190 can provide a platform that enables services to be provided by an available service provider for a requesting user by way of a user application executing on the user devices, and a service provider application executing on the provider devices. As used herein, the computing device 100 can operate as either a provider device (e.g., executing a designated provider application) or as a user device (e.g., executing a designated user application). And the operator 10 of the computing device 100 can be either a user of the network service or a service provider providing the network service. In many examples, the computing device 100 can comprise mobile computing devices, such as smartphones, tablet computers, VR or AR headsets, on-board computing systems of vehicles, smart watches, and the like.

According to examples, a requesting user wishing to utilize the network service can launch the user application and transmit a service request over the network(s) 180 to the network system 190. In certain implementations, the requesting user can view multiple different service types managed by the network system 190. In the context of a transport service, service types can include a ride-share service, an economy service, a luxury service, a professional service provider service (e.g., where the service provider is certified), a self-driving vehicle service, and the like. The user can interact with the interface of the user application to select a particular service type and transmit a service request. In some examples, the service request can include a start location at which a selected service provider is to rendezvous with the requesting user. The start location can be inputted by the user as an address or by setting a location pin on a map interface of the user application, or it can be determined by a current location of the requesting user (e.g., utilizing location-based resources of the computing device operated by the user). Additionally, the requesting user can further input a service location, which can be the location at which the matched service provider is to end the service request.

In response to receiving the service request, the network system 190 can identify available service providers and select an optimal service provider to fulfill the service request. The optimal service provider can be selected from the available service providers based on its location relative to the start location indicated in the service request. The optimal service provider can also be selected based on an ETA to the start location, based on an existing route of the service provider, service provider type, etc. Upon selecting the optimal service provider, the network system 190 can transmit an invitation to a computing device operated by the selected service provider. The selected service provider can accept or reject the invitation. Should the selected service provider reject the invitation, the network system 190 can select another service provider to fulfill the service request. If the selected service provider accepts the invitation, the network system 190 can transmit an optimal route and other information to the computing device operated by the service provider to facilitate the fulfillment of the service request. In certain implementations, the network system 190 can also identify an autonomous vehicle (AV) to service the service request. Thus, the pool of proximate candidate service providers in relation to a start location can also include one or more AVs operating throughout the given region.

According to embodiments, the network system 190 can determine, collect, estimate, and/or maintain service parameters that indicate one or more local conditions associated with the network service. For instance, service parameters can include an expected wait time for requesting users, a number of active users within a given geographic area, an indicator of real-time demand, a price multiplier, etc. Values for the service parameters can vary based on location within the service region. For example, the service region can be divided into subdivisions (e.g., hexagonal subdivisions). And the network system 190 can determine, collect, or estimate respective service parameter values for each of the subdivisions. The service parameter values can be maintained in a database 195 managed by the network system 190 in a data store 198. The database 195 can further include a map store 196 storing map information such as map tiles to render map layers of the GUI map feature.

In certain implementations, the computing device 100 can include a network interface 105 to communicate with the network system 190 over the network(s) 180. The network interface 105 can receive map tiles 197 stored in the map store 196, service data 199 stored in the data store 198, and one or more image processing parameters 193. The service data 199 can represent values of service parameter(s) associated with subdivisions within the service region. The received information can be cached in a memory 150 of the computing device. For example, the received map tiles 197 can be stored in a map cache 153, the received service data 199 can be stored in a data cache 155, and the image processing parameters 193 can be stored as image processing parameters 157 in the memory 150. In addition, the memory 150 can store a program 151 associated with the network service for execution by one or more processors of the computing device 100. For instance, the program 151 can be a dedicated service provider application or a dedicated user application. The GUI map feature generated by the computing device 100 can be rendered in an interface of the program 151 executed by the computing device 100. In addition, the program 151 can include instructions, that when executed by the one or more processors of the computing device 100, cause the computing device 100 to generate and present the GUI map feature, including at least a map layer and a visual data layer.

According to embodiments, the computing device 100 can include a mapping engine 145 to generate a map layer for the GUI map feature. The mapping engine 145 can determine a set of anchor coordinates 146 based on location data 116 generated by a position resource 115 (e.g., GPS, GLONASS, BeiDou, or Galileo receiver). The mapping engine 145 can further determine the set of anchor coordinates 146 based on a current viewable map area displayed in the GUI map feature on the display 110 of the computing device 100. The anchor coordinates 146 can be transmitted to the network system 190 or the database 195 to retrieve relevant map tiles 197 and service data 199 over the network(s) 180.

In the examples described herein, the service data used to generate the visual data layer can be in vector form and can be processed to create a bitmap during the process to generate the visual data layer. To do so, the computing device 100 can include a rasterization engine 135 to process service data 156-1 and 156-2 to generate one or more bitmaps 136. As illustrated in exemplary FIG. 1, service data 156-1 and 156-2 can be retrieved from the data cache 155 maintained in the memory 150 of the computing device 100 to generate the bitmap 136. Such data can be cached by the memory 150 after being previously received over the network(s) 180 from the network system 190 and/or database 195. The service data 156-1 and 156-2 can also be directly received from over the network(s) 180 via the network interface 105. For example, the computing device 100 can determine that the service data maintained in the data cache 155 is out of date or does not contain relevant portions of the map being rendered. In response, the computing device 100 can transmit a request 147 to the network system 190 to retrieve up-to-date service data 199 for the relevant map area being rendered for use by the rasterization engine 135.

In certain implementations, the service data retrieved (e.g., from memory 150 or over network(s) 180) for use by the rasterization engine 135 can include a first set of data (e.g., service data (map area) 156-1) corresponding to service parameter values associated with the visible regions of the map being rendered in the GUI map feature and a second set of additional data (e.g., service data (additional) 156-2). The additional service data 156-2 can be used to generate buffer regions of the bitmap 136 used to perform one or more image processing functions such as blurring or smoothing. The additional service data 156-2 can correspond to service parameter values associated with subdivisions within the service region that are adjacent or nearby to those that are displayed in the GUI map feature. Using the service data, the rasterization engine 135 can convert the service data 156-1 and 156-2, which are represented in vector format, to bitmap 136, which is represented in a pixelmap or bitmap format. Exemplary bitmaps 136 generated by the rasterization engine 135 are illustrated in FIGS. 3A to 3G. As described, the generated bitmap 136 may be larger in size than the map to be displayed in the GUI map feature. It may contain one or more buffer regions such that image processing functions can be performed.

According to embodiments, the computing device 100 can include an image processing engine 140 to perform one or more image processing functions on the bitmap 136 generated by the rasterization engine 135. The output of the image processing engine 140 can be a processed bitmap 140. To perform the one or more image processing functions, the image processing engine 140 can receive an image processing parameter 158 from the memory 150 or from the network system 190 (or the database 195). The value of the image processing parameter 158 controls at least one aspect of the one or more image processing functions. In one example, the image processing engine 140 performs a Gaussian blur function to generate visual data layer 141 (e.g., a processed bitmap) using the bitmap 136. The blur radius of the Gaussian blur function can be defined by the image processing parameter 158.

In certain implementations, the image processing parameter 158 can be determined by the computing device 100 based on the map region displayed within the GUI map feature, the zoom level of the GUI map feature, and/or the relative size of each subdivision of the service region for which a service parameter value is estimated or determined by the network system 190. For instance, the Gaussian blur radius can be defined relative to or based on the subdivision size (e.g., in pixels) at the particular zoom level at which the GUI map feature is to be rendered. As the zoom level is altered (e.g., as the GUI map feature is zoomed in or out), the blur radius will be altered correspondingly. In one implementation, the Gaussian blur radius is determined to be half of the radius of the hexagonal subdivisions. As the GUI map feature is zoomed out (e.g., via an operator input 11 to the computing device 100), each subdivision of the service region is represented using fewer pixels on the display 110 of the computing device 100. Accordingly, as the GUI map feature is zoomed out, the blur radius (in terms of pixels on the bitmap) is reduced correspondingly. In another implementation, the Gaussian blur radius is determined to be equal to the radius of the subdivisions.

In addition or as an alternative, the image processing parameter 158 can be determined by the network system 190 and/or by the computing device 100 based on the service region of the network service. For instance, a different blur radius can be used to perform Gaussian blur functions to generate visual data layers (e.g., a heatmap) for the San Francisco service region as compared with the New Delhi service region. Furthermore, the image processing parameter 158 can be dynamically determined based on the service data 156-1 and 156-2. For example, a blur radius of a Gaussian blur function can be determined based on the differences in service parameter values of adjacent subdivisions to be rendered in the GUI map feature. As an example, the blur radius of the Gaussian blur function can be dynamically decreased if the computing device 100 determines that the service parameter across the map area to be displayed within the GUI map feature are relatively uniform in value. In this manner, processing resources of the computing device 100 can be conserved in situations where the results achieved with a lower Gaussian blur radius can be acceptable. Similarly, the blur radius can be dynamically increased if it is determined that the service parameter values in the area depicted in the GUI map feature have low uniformity (e.g., there are relatively large differences in service parameter values between adjacent subdivisions).

Figure 3A:
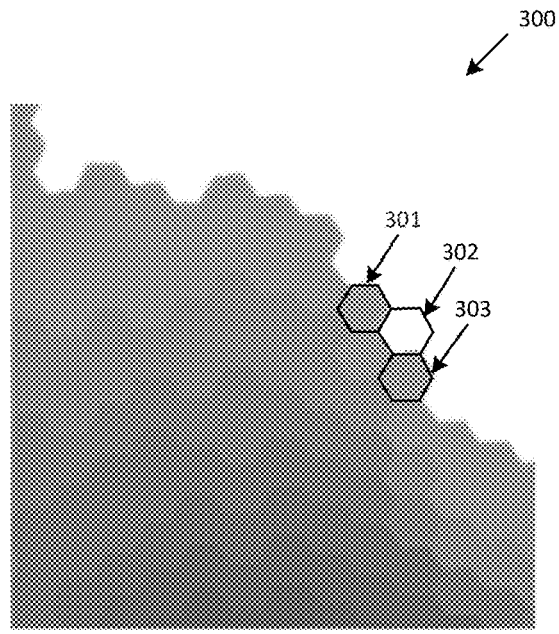
FIGS. 3A-G illustrate exemplary bitmaps and exemplary visual data layers, in accordance with examples described herein.
Figure 3B:
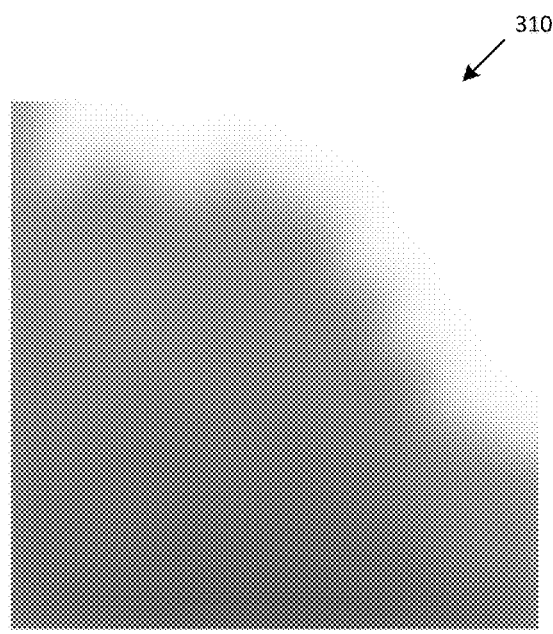
Figure 3C:
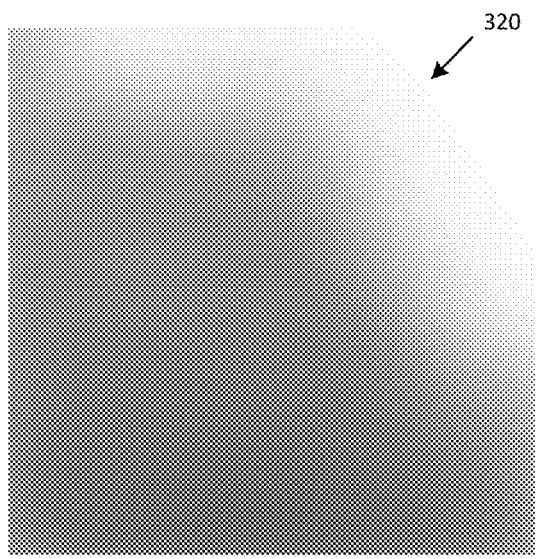
Figure 3D:
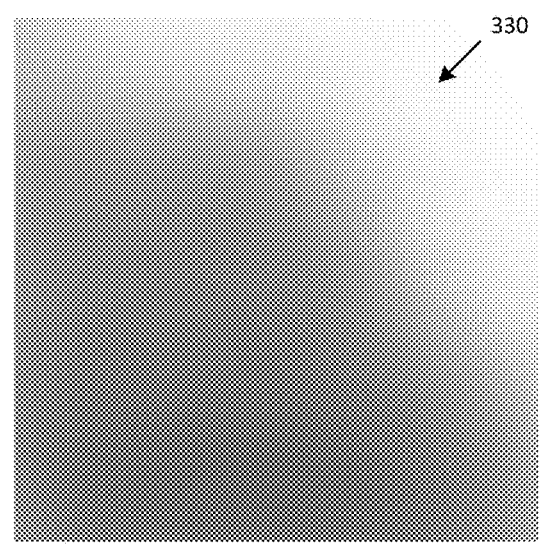
Figure 3E:
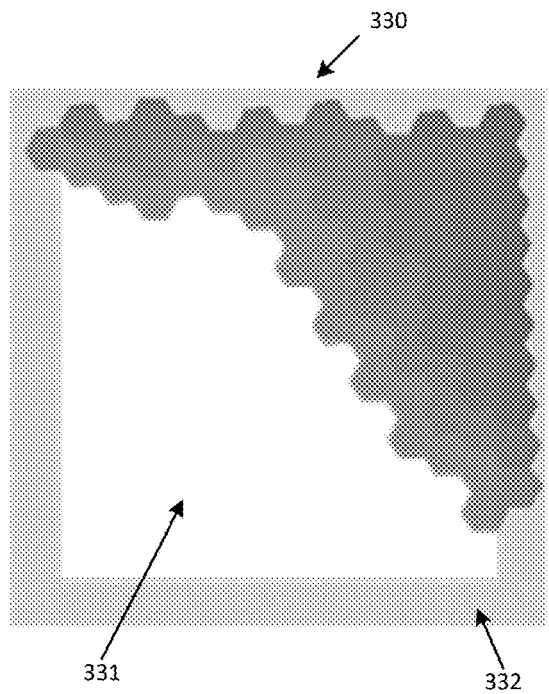
Figure 3F:
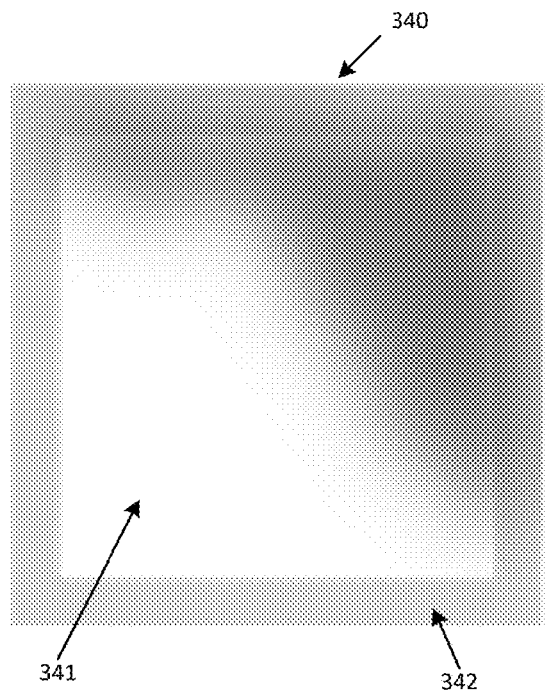

An exemplary bitmap generated by the image processing engine 140 after image processing functions (e.g., Gaussian blur) are performed is illustrated in FIG. 3F. As can be seen in FIG. 3F, the bitmap illustrated therein includes a buffer region. The buffer region is created using the additional service data 156-2 such that image processing functions can be properly performed on the edges of the viewable map region in the GUI map feature. In some examples, the image processing engine 140 can crop the buffer region of the bitmap to remove the buffer regions. After cropping is performed, the resulting bitmap can be output as the visual data layer 141 to the mapping engine 145. Exemplary visual data layers 141 are illustrated in FIGS. 3B-3D and 3G. The visual data layer 141 can be a bitmap in format (e.g., image is represented in pixels) and can be a heatmap illustrating the service parameter values across the map area depicted in the GUI map feature. According to examples, the colors used in the visual data layer 141 can be determined based on whether the GUI map feature is being presented in a day mode or in a night mode (or dark mode). In the day mode, where brighter colors are used to render user interface features, a brighter color can be selected for the visual data layer 141 by the rasterization engine 135 and the image processing engine 140. In the night mode, darker colors may be selected for the visual data layer 141. The computing device 100 and/or program 151 can dynamically determine to operate in the day mode or in the night mode based on, for example, the time of day. Where the computing device 100 is a provider device, the device 100 and/or program 151 can determine to operate in the day mode or the night mode based on whether the headlights of a vehicle operated by the service provider is turned on or off.

In many implementations of the computing device 100, the rasterization engine 135 and the image processing engine 140 can be implemented using graphical processing units (GPUs) of the computing device 100 (e.g., GPU 130). In other examples, the rasterization engine 135 and/or the image processing engine 140 can be implemented in software using central processing units (CPUs) or using other specialized hardware such as dedicated digital signal processors (DSPs), application specific integrated circuits (ASICs), or field programmable gate arrays (FPGAs).

According to embodiments, the mapping engine 145 can receive the visual data layer 141 generated by the image processing engine 140 and overlay the visual data layer 141 with a map layer. The mapping engine 145 can generate the map layer using map tiles 197 received from the network system 190 and/or map tiles 156 cached in the map cache 155. Like the subdivisions of the service region, the map tiles 197 and 156 can be hexagonal in shape. The mapping engine 145 can stitch together map tiles 197 and/or map tiles 156 to generate a map layer. The map layer can depict geographic, navigational and other features to be rendered on the GUI map feature. For example, the map layer can depict roads, buildings, geographic features such as bodies of water, mountains, etc. Furthermore, the map layer can comprise a plurality of layers, one for each type of feature being depicted. For example, the map layer can comprise a road layer depicting roads and highways and a terrain layer depicting geographical features. In some implementations, to overlay the visual data layer 141 with the map layer, the mapping engine 145 is configured to overlay the visual data layer 141 on top of the terrain layer and further overlay the road layer on top of the visual data layer 141. The mapping engine 145 can be further configured to generate and overlay additional layers such as a traffic layer depicting traffic conditions, etc. to generate the GUI map feature 148. The GPU 130 can render the GUI map feature 148 and generate display data 116 for that is presented on a display 110 of the computing device 100. In addition, the mapping engine 145 can include information relating to the current position of the computing device for presentation on the GUI map feature. For example, a current location marker can be an additional layer to be included in the GUI map feature. Using such a marker, the operator of the computing device 100 can visualize his or her current location relative to areas of potential interest (e.g., an area having dark shades on the heatmap), thus improving the significance of information presented in the GUI map.

According to embodiments, the display 110 of the computing device can receive input 11 (e.g., a multi-touch gesture) from an operator 10. The input 11 can manipulate the GUI map feature presented on the display 110 and cause the computing device to update or re-generate the GUI map feature 148. For instance, the input 11 can change a zoom level of the GUI map feature or can change the viewable map area or the anchor coordinates of the GUI map feature. In addition, the GUI map feature 148 can be updated or re-generated based on updated service data made available by the network system 190. For example, the service data used to generate the visual data layer of the GUI map feature can be set to expire or be marked as out-of-date after a predetermined amount of time and updated service data can be retrieved to update the GUI map feature. As another example, the computing device 100 can be configured to communicate with the network system 190 periodically to determine whether real-time service data maintained by the network system 190 diverges from the service data used by the computing device 100 to generate the GUI map feature. If the data diverges (e.g., the GUI map feature is now based on outdated service data), the computing device can retrieve updated service data and re-generate the GUI map feature. Furthermore, if only a portion of the service data is updated compared with the data used to generate the GUI map feature, the computing device can be configured to save network resources retrieving only the updated data and re-using the other portions of the data which may be cached in the memory 150.

In certain examples, the computing device 100 can be optimized to reduce network traffic and overhead when altering the zoom level of the GUI map feature. For instance, when altering the zoom level from a first zoom level to a second zoom level, the computing device 100 can be configured to utilize a bitmap generated for the first zoom level to generate the visual data layer for the second zoom level without retrieving additional service data from the network system. To do so, the computing device can first determine local re-generation of the visual data layer (e.g., without retrieving additional service data over the network(s) 180) is supported. This can depend on whether the first and second zoom levels are comparable (e.g., whether they are adjacent zoom levels). Local re-generation of the visual data layer may not be supported if the first and second zoom levels are drastically different and thus displaying vastly different map areas. This can further depend on the direction of the zoom level change (e.g., whether zooming in or zooming out). Local re-generation of the visual data layer may be available when zooming in but not when zooming out. If local re-generation of the visual data layer is available, the computing device 100 can down sample the bitmap created for the first zoom level and then apply a Gaussian blur function (adjusting the blur radius in the process) to the resulting down-sampled bitmap to generate the visual data layer for the second zoom level.

As another example, if there are twelve (12) possible zoom levels for the GUI map feature, with zoom level 12 being the most zoomed in (GUI map feature illustrating the smallest physical, geographic area), zoom levels 1, 4, 7, and 10 can be determined to be basis zoom levels. In other words, bitmaps created for these zoom levels can be used to generate visual data layers for other zoom layers without retrieving additional data over the network. Thus, when zooming in from zoom level 1 to zoom levels 2 or 3 on the GUI map feature, the computing device 100 can generate updated visual data layers for zoom levels 2 or 3 using the bitmap created for zoom level 1. The computing device 100 can down-sample the bitmap created for zoom level 1 and perform Gaussian blurring functions to arrive at the visual data layers for zoom levels 2 and 3. In this process, the down-sample rate and the blur radius may be determined based on the adjustment in zoom level. In one implementation, when locally re-generating the visual data layers, the blur radius (measured in bitmap pixels) used in the Gaussian blur function is doubled for every increase in zoom level. For instance, when zooming in from zoom level 1 to zoom level 2, the Gaussian blur radius used in the local re-generation process is 2× the Gaussian blur radius for zoom level 1, and when zooming in from zoom level 1 to zoom level 3, the Gaussian blur radius used is 4× the Gaussian blur radius for zoom level 1. Continuing with this example having twelve zoom levels, when zooming in from zoom level 1 to zoom level 8, the computing device can determine the adjustment in zoom level to be too great (the adjustment crosses two other basis zoom levels—zoom levels 4 and 8) for local re-generation to be performed. Instead, service data is retrieved from the network system 190 and a bitmap is created for zoom level 7 and the bitmap is down-sampled and blurred to obtain the visual data layer for zoom level 8. In this manner, not only is network resources of both the computing device and the network system 190 conserved when zoom level adjustments are made to the GUI map feature, the network system 190 is further saved from having to maintain service data for every one of the zoom levels (e.g., the non-basis zoom levels). Thus, the computational resources of the network system 190 is further conserved. In addition, the computing device 100 can cache and re-use service data when altering between zoom levels and when panning the GUI map feature to further optimize network resource usage.

Methodology

Figure 2:
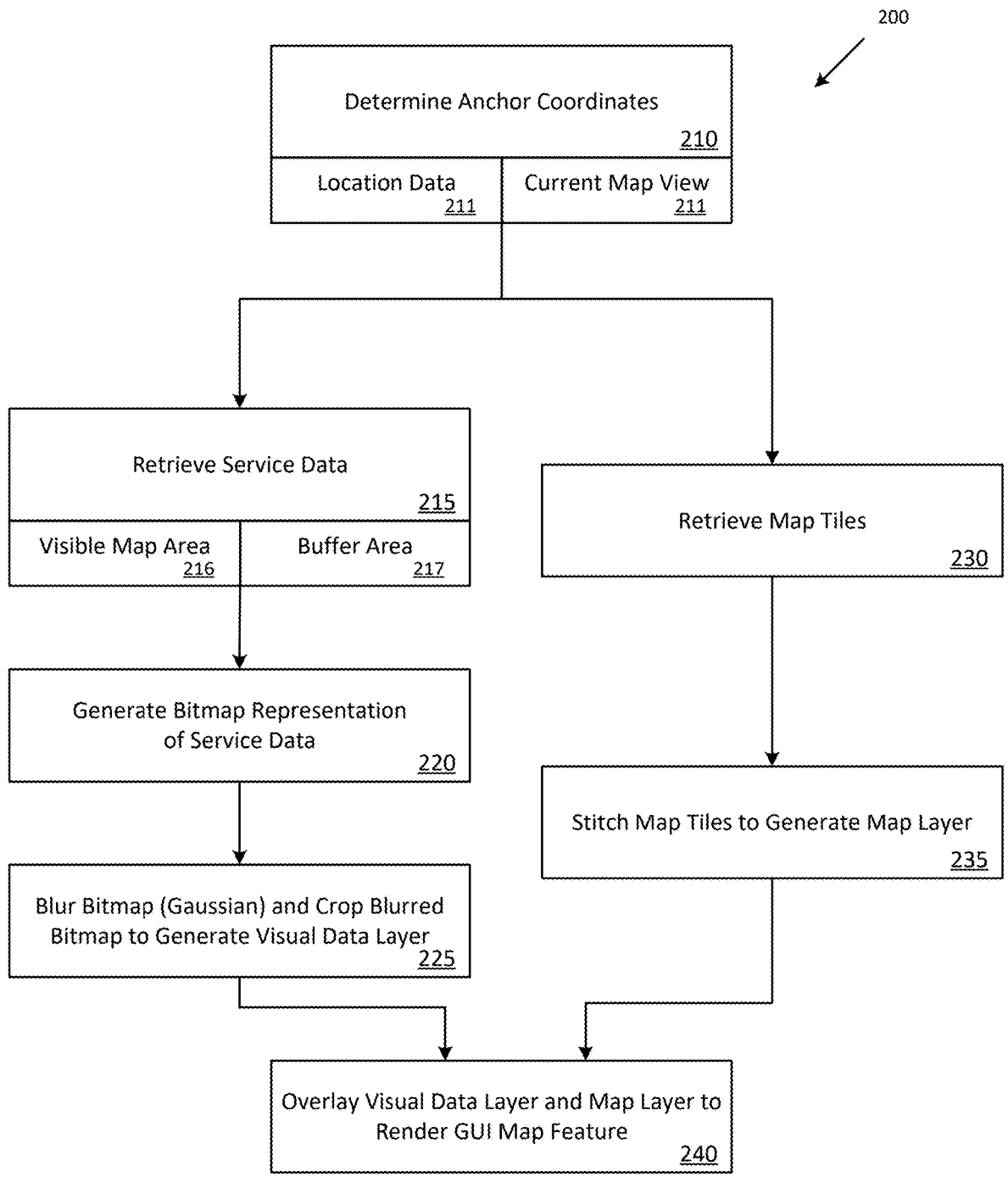
FIG. 2 is a flow chart describing an example method of generating a graphical user interface (GUI) map feature, according to examples described herein.

FIG. 2 is a flow chart describing an example method of generating a GUI map feature, according to examples described herein. In the below discussion of FIG. 2, reference may be made to features and examples shown and described with respect to FIG. 1. For instance, the example method illustrated by FIG. 2 can be performed by the computing device 100 of FIG. 1.

Referring to FIG. 2, the computing device 100 determines a set of anchor coordinates (210). The set of anchor coordinates can be determined based on location data (211) generated by a location-aware resource (e.g., a GPS, GLONASS, BeiDou, or Galileo receiver). The set of anchor coordinates can also be determined based on the current map view to be presented on the GUI map feature. For instance, based on the location of the region to be presented on the GUI map feature (e.g., in relation to the service region), a set of anchor coordinates can be determined.

Based on the set of anchor coordinates, the computing device can retrieve relevant service data (215). The retrieval of the service data can be based further on a zoom level to be applied to the GUI map feature. The service data can represent service parameter values in or near the map area to be displayed on the GUI map feature. The service data retrieved can correspond to the visible map area (216) and a buffer area surrounding the visible map area (217). Service data for the buffer area is retrieved to enable image processing functions to be performed on the entire visible map area. The service data can be retrieved from the network system managing the network service or from on-board memory in which service data received from the network system were previously cached.

A bitmap representation (e.g., data represented in pixels) of the service data can be generated by the computing system (220). This can be done using a rasterization process to convert vector data to a bitmap. Subsequently, image processing functions can be performed on the bitmap to generate the visual data layer (225). In certain implementations a Gaussian blur function can be performed on the generated bitmap to generate the visual data layer. In addition, the computing system can be configured to remove the buffer region from the visual data layer. The visual data layer can represent a heatmap illustrating variations in value of a service parameter across the map region to be displayed on the GUI map feature.

Based the set of anchor coordinates (and/or the zoom level), the computing device can further retrieve a set of map tiles to be used to generate a map layer for the GUI map feature (230). Like the service data, the map tiles can be retrieved from the network system or from on-board memory in which map tiles were previously cached. The computing device is further configured to stitch the map tiles to generate the map layer (235). Steps 230 and 235 can be performed contemporaneously or substantially contemporaneously with steps to generate the visual data layer (215, 220, 225).

After the visual data layer and the map layer are generated, the computing system can overlay the visual data layer and the map layer to render the GUI map feature (240) and present the GUI map feature on a display of the computing device. In certain implementations, the map layer is comprised of a terrain layer and a road layer. The computing system can render the GUI map feature such that the visual data layer is overlaid on top of the terrain layer and the road layer is overlaid on top of the visual data layer.

Visual Data Layer

FIGS. 3A-G illustrate exemplary bitmaps and exemplary visual data layers, in accordance with examples described herein. In the examples illustrated in FIGS. 3A-G, the bitmaps generated can be heatmaps depicting service parameter value variations across a displayed map region. For instance, the heatmaps can illustrate service demand level (e.g., number of active users requesting service) variations across the displayed map area. The visual data layer that is generated (e.g., FIGS. 3B-D, 3G) can be overlaid with a map layer to generate a GUI map feature that includes the heatmap. In the below discussion of FIGS. 3A-G, reference may be made to features and examples shown and described with respect to FIG. 1. For instance, the bitmaps illustrated in FIGS. 3A-G can be generated by the computing device 100 of FIG. 1 and, in particular, by one or more of the rasterization engine 135 and/or the image processing engine 140 of FIG. 1.

FIG. 3A illustrates an exemplary bitmap (e.g., bitmap 136) generated by a converting service data (e.g., service data 156-1 and 156-2) to a bitmap format. The bitmap 300 can be generated by the rasterization engine 135 of FIG. 1. Within bitmap 300, service parameter values are illustrated using shades. For instance, a darker shade can mean a higher service parameter value. Unshaded areas of the bitmap can represent locations where the service parameter values are at a baseline value or are zero. In bitmap 300, hexagonal subdivisions of the service region can be seen and three are labeled in FIG. 3A. Subdivision 302 is unshaded, meaning that the service parameter value (e.g., demand level, price multiplier, user wait time, etc.) within the geographic area represented by the subdivision 302 is at a baseline value or is zero. In contrast, subdivisions 301 and 303 are represented as shaded and thus have higher service parameter values when compared with subdivision 302.

FIGS. 3B-D illustrate exemplary visual display layers generated by performing image processing functions on the bitmap 300. The layers illustrated in FIGS. 3B-3D can each be the visual display layer 141 generated by the image processing engine 140 of FIG. 1. Visual display layers 300, 320, and 330 illustrated in FIGS. 3B-D can be generated by performing Gaussian blur functions on the bitmap 300, but each being generated using different Gaussian blur radii. For example, the visual display layer 310 is generated using the lowest Gaussian blur radius of the three. The visual display layer 320 is generated using the median Gaussian blur radius and the visual display layer 330 is generated using the highest Gaussian blur radius. According to examples, the computing device can identify and ignore unshaded regions of the bitmap 300 prior to performing the Gaussian blur function so as to conserve computing resources.

Figure 3G:
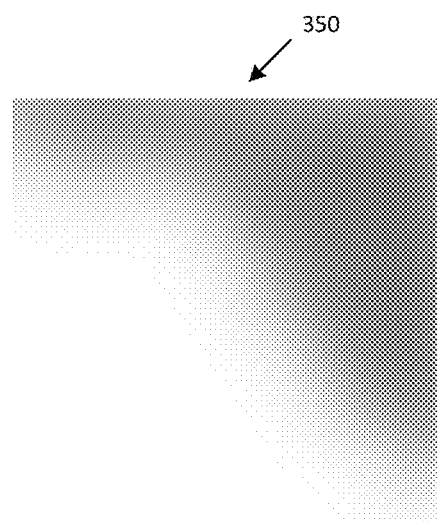

FIG. 3E illustrate a bitmap 300 having a display region 331 and a buffer region 332. The display region 331 can correspond to the portions of the bitmap 330 that are to be displayed on the GUI map feature by the computing device. Service data used to generate the display region can be service data (map region) 156-1 of FIG. 1. The buffer region 332 can correspond to regions of the bitmap 330 that are created to facilitate image processing functions on the bitmap 330 to generate a visual data layer. For example, to perform a Gaussian blur function on any given pixel, a plurality of neighboring pixels is required. Thus, the buffer region 332 is created such that Gaussian blur function can be performed on all pixels within the display region 331, including those at the edge of the display region 331. The buffer region 332 be created using service data (additional) 156-2 of FIG. 1. FIG. 3F illustrates the result of performing a Gaussian blur function on the bitmap 330. The resulting bitmap 340 also comprises a display region 341 and a buffer region 342. The image processing engine 140 can be configured to crop the resulting bitmap 340 to remove the buffer region 342. FIG. 3G illustrates a resulting visual display layer 350 after the buffer region 342 has been removed.

Hardware Diagram

Figure 4:
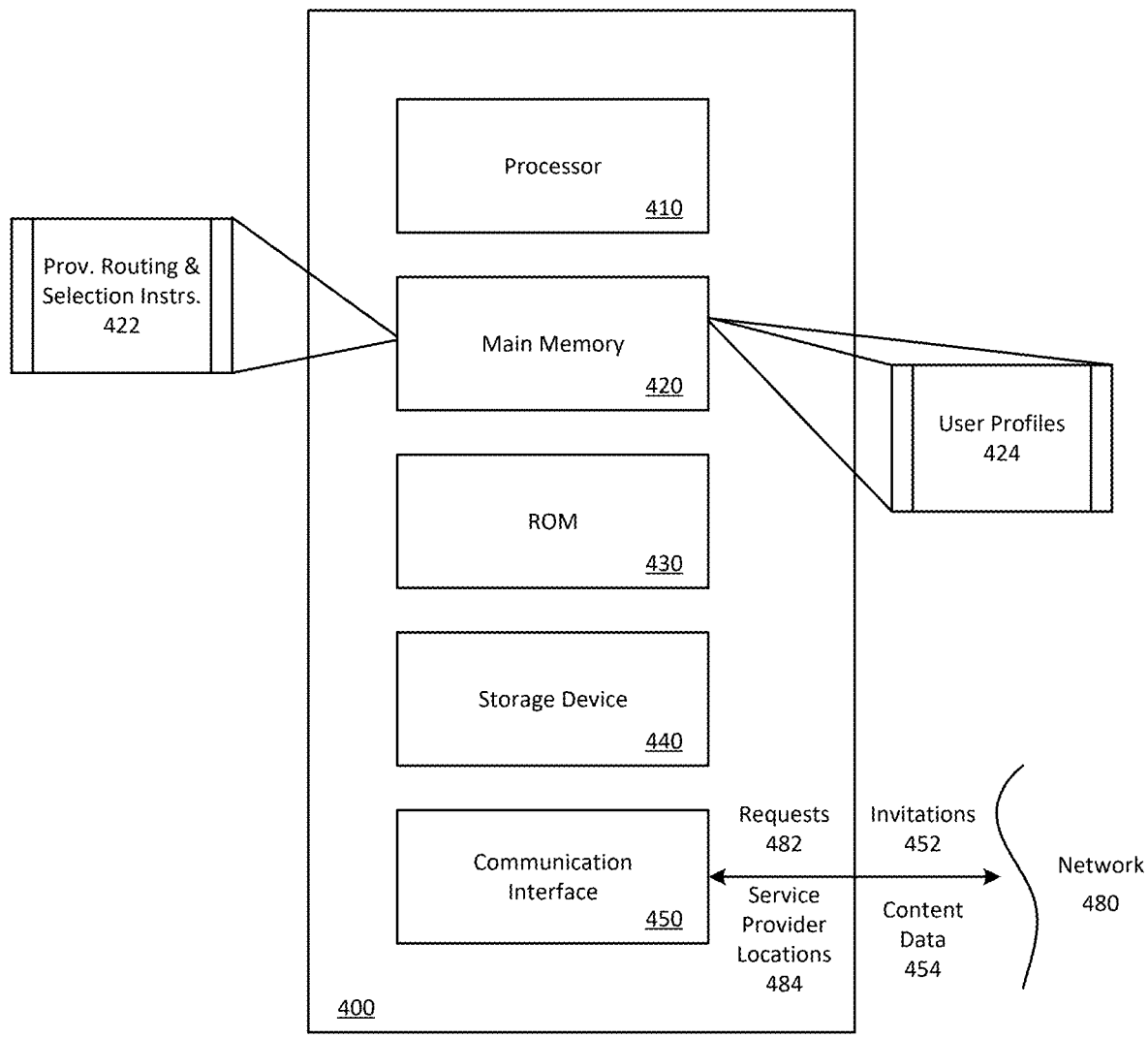
FIG. 4 is a block diagram illustrating a computer system upon which examples described herein may be implemented.

FIG. 4 is a block diagram that illustrates a computer system upon which examples described herein may be implemented. A computer system 400 can be implemented on, for example, a server or combination of servers. For example, the computer system 400 may be implemented as part of a network service, such as described in FIGS. 1 through 3. In the context of FIG. 1, the network system 190 may be implemented using a computer system 400 such as described by FIG. 4. The network system 190 and may also be implemented using a combination of multiple computer systems as described in connection with FIG. 4.

In one implementation, the computer system 400 includes processing resources 410, a main memory 420, a read-only memory (ROM) 430, a storage device 440, and a communication interface 450. The computer system 400 includes at least one processor 410 for processing information stored in the main memory 420, such as provided by a random access memory (RAM) or other dynamic storage device, for storing information and instructions which are executable by the processor 410. The main memory 420 also may be used for storing temporary variables or other intermediate information during execution of instructions to be executed by the processor 410. The computer system 400 may also include the ROM 430 or other static storage device for storing static information and instructions for the processor 410. A storage device 440, such as a magnetic disk or optical disk, is provided for storing information and instructions.

The communication interface 450 enables the computer system 400 to communicate with one or more networks 480 (e.g., cellular network) through use of the network link (wireless or wired). Using the network link, the computer system 400 can communicate with one or more computing devices, one or more servers, one or more databases, and/or one or more self-driving vehicles. In accordance with examples, the computer system 400 receives requests 482 from mobile computing devices of individual users. The executable instructions stored in the memory 430 can include provider routing and selection instructions 422, which the processor 410 executes to perform optimizations of one or more service parameters to select a service provider(s) in response to a service request 482 and to determine routes for the selected service provider(s).

The executable instructions stored in the memory 420 can also include content generation instructions 424, which enable the computer system 400 to access user profiles 424 and other user information in order to select and/or generate user content 454 for display on the user devices. By way of example, the instructions and data stored in the memory 420 can be executed by the processor 410 to implement an example network system 190 of FIG. 1. In performing the operations, the processor 410 can receive requests 482 and service provider locations 484, and submit invitation messages 452 to facilitate the servicing of the requests 482. The processor 410 is configured with software and/or other logic to perform one or more processes, steps and other functions described with implementations, such as described by FIGS. 1 to 4, and elsewhere in the present application.

Examples described herein are related to the use of the computer system 400 for implementing the techniques described herein. According to one example, those techniques are performed by the computer system 400 in response to the processor 410 executing one or more sequences of one or more instructions contained in the main memory 420. Such instructions may be read into the main memory 420 from another machine-readable medium, such as the storage device 440. Execution of the sequences of instructions contained in the main memory 420 causes the processor 410 to perform the process steps described herein. In alternative implementations, hard-wired circuitry may be used in place of or in combination with software instructions to implement examples described herein. Thus, the examples described are not limited to any specific combination of hardware circuitry and software.

User Device

Figure 5:
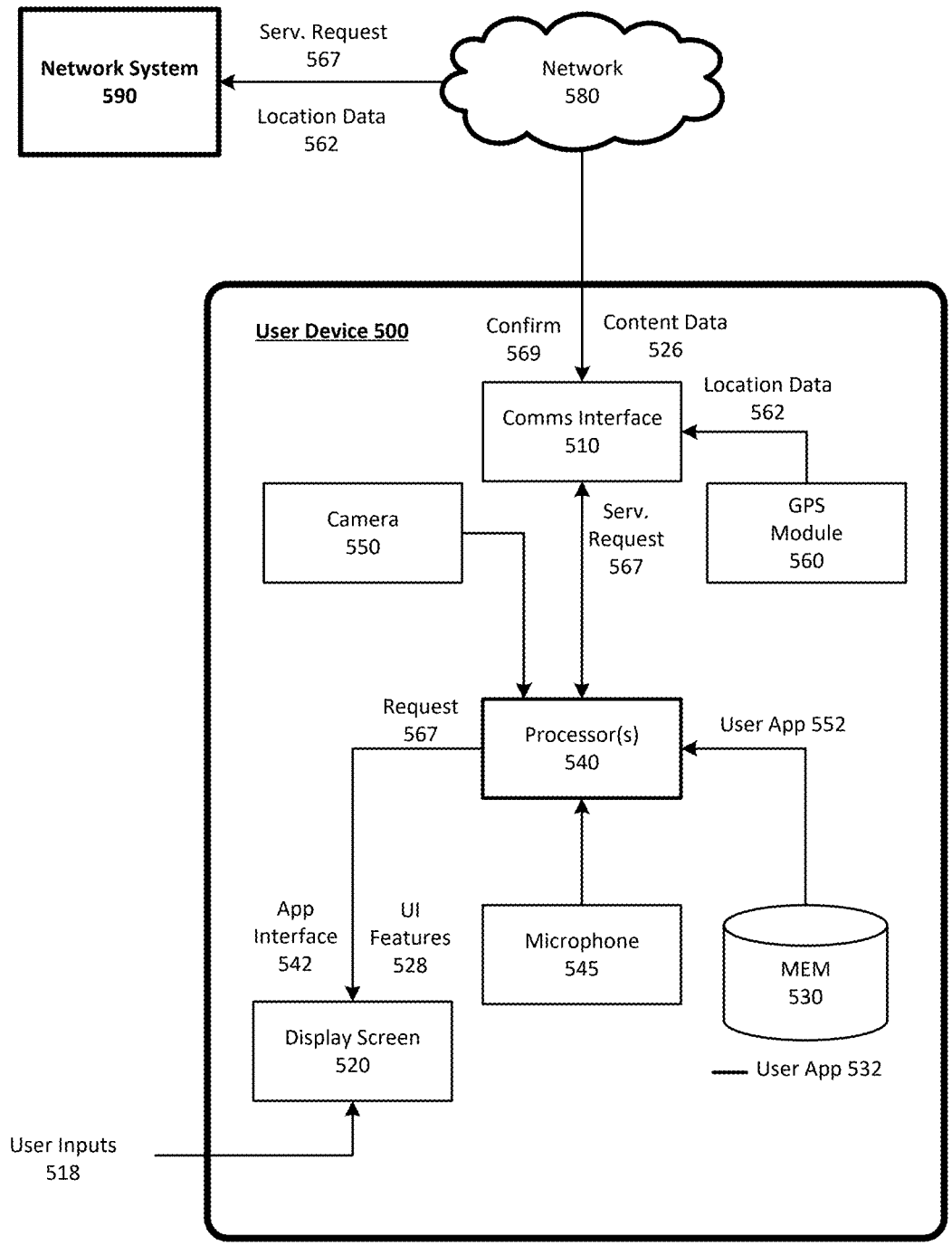
FIG. 5 is a block diagram illustrating an example user device executing a designated user application for a network service, as described herein.

FIG. 5 is a block diagram illustrating an example user device executing and operating a designated user application for communicating with a network service, according to examples described herein. In many implementations, the user device 500 can comprise a mobile computing device, such as a smartphone, tablet computer, laptop computer, VR or AR headset device, and the like. As such, the user device 500 can include typical telephony features such as a microphone 545, a camera 550, and a communication interface 510 to communicate with external entities using any number of wireless communication protocols. In certain aspects, the user device 500 can store a designated application (e.g., a user app 532) in a local memory 530. In variations, the memory 530 can store additional applications executable by one or more processors 540 of the user device 500, enabling access and interaction with one or more host servers over one or more networks 580.

In response to a user input 518, the user app 532 can be executed by a processor 540, which can cause an app interface 542 to be generated on a display screen 520 of the user device 500. The app interface 542 can enable the user to, for example, enter a request for service. In various implementations, the app interface 542 can further enable the user to enter or select one or more start locations and/or one or more service locations (e.g., by entering an address, performing a search, or selecting on an interactive map). Furthermore, the app interface 542 can display dynamically information relating to the requested service. The user can generate a request 567 via user inputs 518 provided on the app interface 542.

As provided herein, the user application 532 can further enable a communication link with a network system 590 over the network 580, such as the network system 190 as shown and described with respect to FIG. 1. The processor 540 can generate user interface features 528 (e.g., map, request status, content cards, etc.) using content data 526 received from the network system 590 over network 580. Furthermore, as discussed herein, the user application 532 can enable the network system 590 to cause the generated user interface 528 to be displayed on the application interface 542.

The processor 540 can transmit the requests 567 via a communications interface 510 to the backend network system 590 over a network 580. In response, the user device 500 can receive a confirmation 569 from the network system 590 indicating the selected service provider that will service the request 567. In various examples, the user device 500 can further include a GPS module 560, which can provide location data 562 indicating the current location of the requesting user to the network system 590 to, for example, establish the service location.

Provider Device

Figure 6:
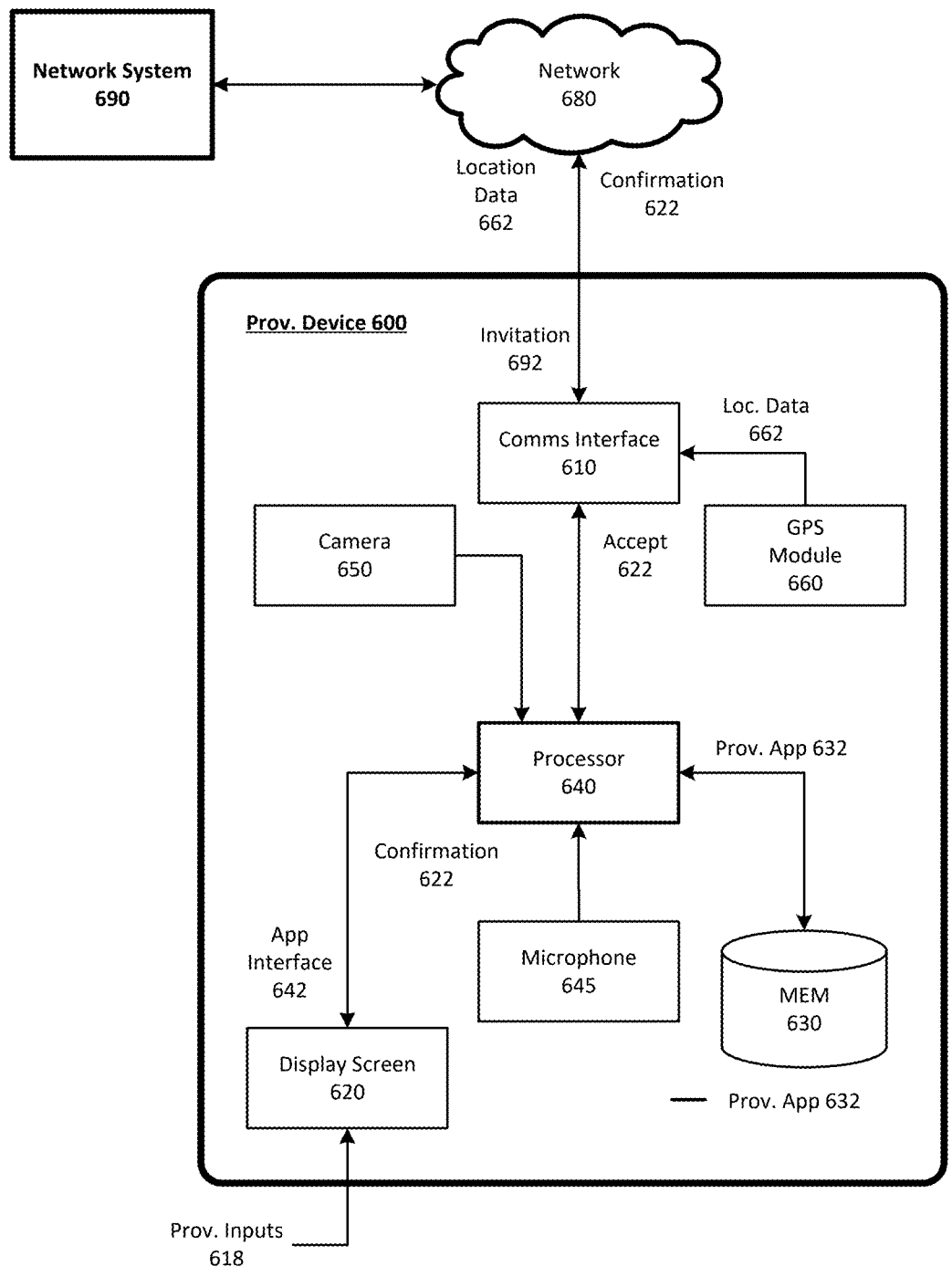
FIG. 6 is a block diagram illustrating an example provider device executing a designated service provider application for a network service, as described herein.

FIG. 6 is a block diagram illustrating an example provider device executing a designated service provider application for a network service, as described herein. In many implementations, the provider device 600 can comprise a mobile computing device, such as a smartphone, tablet computer, laptop computer, VR or AR headset device, and the like. As such, the provider device 600 can include typical telephony features such as a microphone 645, a camera 650, and a communication interface 610 to communicate with external entities using any number of wireless communication protocols. The provider device 600 can store a designated application (e.g., a service provider app 632) in a local memory 630. In response to a provider input 618, the service provider app 632 can be executed by a processor 640, which can cause an app interface 642 to be generated on a display screen 620 of the provider device 600. The app interface 642 can enable the service provider to, for example, accept or reject invitations 692 in order to service requests throughout a given region.

In various examples, the provider device 600 can include a GPS module 660, which can provide location data 662 indicating the current location of the service provider to the network system 690 over a network 680. Thus, the network system 690 can utilize the current location 662 of the service provider to determine whether the service provider is optimally located to service a particular service request. If the service provider is optimal to service the service request, the network system 690 can transmit an invitation 692 to the provider device 600 over the network 680. The invitation 692 can be displayed on the app interface 642, and can be accepted or declined by the service provider. If the service provider accepts the invitation 692, then the service provider can provide a user input 618 on the displayed app interface 642 to provide a confirmation 622 to the network system 690 indicating that the service provider will rendezvous with the requesting user at the start location to service the service request.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A computer-implemented method of presenting a graphical user interface (GUI) map feature, the method being performed by a computing device and comprising:
   determining a set of anchor coordinates for the GUI map feature, wherein the GUI map feature comprises a map layer and a visual data layer;
   retrieving, based, at least in part, on the set of anchor coordinates, a set of map tiles for generating the map layer and a first set of service data for generating the visual data layer, the first set of service data being data associated with a transport service or a delivery service within a first region corresponding to a map area to be illustrated by the GUI map feature;
   dynamically determining an image processing parameter based at least in part on a geographic region within which the first region corresponding to the map area is located and a zoom level of the GUI map feature;
   retrieving, based on the image processing parameter, a second set of service data for generating the visual data layer, the second set of service data being data associated with the transport service or the delivery service within a second region corresponding to a buffer area that is not a part of the map area;

generating the visual data layer by creating a bitmap using the first and second sets of service data and performing, based on the image processing parameter, one or more image processing functions on the bitmap, wherein the bitmap includes a first portion corresponding to the map area and a second portion corresponding to the buffer area; and presenting, on a display of the computing device, the GUI map feature by overlaying the visual data layer with the map layer.

2. The computer-implemented method of claim 1, wherein the visual data layer is a heatmap depicting values of a service parameter of the transport service or the delivery service across the map area to be illustrated by the GUI map feature, wherein the transport service or the delivery service is managed by a network system communicatively coupled to the computing device via one or more networks.

3. The computer-implemented method of claim 2, wherein the first and second sets of service data represent values of the service parameter of the transport service or the delivery service.

4. The computer-implemented method of claim 2, wherein the service parameter is a price multiplier or a user demand level associated with the transport service or the delivery service.

5. The computer-implemented method of claim 2, wherein the set of map tiles and the first and second sets of service data are retrieved, over the one or more networks, from the network system or from a database managed by the network system.

6. The computer-implemented method of claim 1, wherein the set of map tiles and the first and second sets of service data are retrieved based further on the zoom level for the GUI map feature.

7. The computer-implemented method of claim 1, wherein the one or more image process functions includes a Gaussian blur function and the image processing parameter is a Gaussian blur radius for the Gaussian blur function.

8. The computer-implemented method of claim 1, further comprising, in response to receiving an input to adjust the zoom level of the GUI map feature from an initial zoom level to a desired zoom level, using the bitmap created for the initial zoom level to generate the visual data layer for the desired zoom level.

9. The computer-implemented method of claim 8, wherein using the bitmap created for the initial zoom level to generate the visual data layer for the desired zoom level comprises:

down-sampling the bitmap created for the initial zoom level to generate a new bitmap; and performing a Gaussian blur function on the new bitmap using a first Gaussian blur radius that is different from a second Gaussian blur radius used to create the visual data layer for the initial zoom level.

10. The computer-implemented method of claim 1, wherein the set of anchor coordinates is determined based on one or more of: (i) location data generated by location-aware resources of the computing device, or (ii) the map area to be illustrated by the GUI map feature.

11. The computer-implemented method of claim 1, wherein the map layer further comprises at least a terrain layer and a road layer and wherein the GUI map feature is presented such that the visual data layer is overlaid on top of the terrain layer and the road layer is overlaid on top of the visual data layer.

12. A computing device comprising:

a display;

one or more processors; and one or more memory resources storing instructions that, when executed by the one or more processors of the computing device, cause the computing device to:

determine a set of anchor coordinates for a graphical user interface (GUI) map feature, wherein the GUI map feature comprises a map layer and a visual data layer;

retrieve, based, at least in part, on the set of anchor coordinates, a set of map tiles for generating the map layer and a first set of service data for generating the visual data layer, the first set of service data being data associated with a transport service or a delivery service within a first region corresponding to a map area to be illustrated by the GUI map feature;

dynamically determine an image processing parameter based at least in part on a geographic region within which the first region corresponding to the map area is located and a zoom level of the GUI map feature;

retrieve, based on the image processing parameter, a second set of service data for generating the visual data layer, the second set of service data being data associated with the transport service or the delivery service within a second region corresponding to a buffer area that is not a part of the map area;

generate the visual data layer by creating a bitmap using the first and second sets of service data and performing, based on the image processing parameter, one or more image processing functions on the bitmap, wherein the bitmap includes a first portion corresponding to the map area and a second portion corresponding to the buffer area; and present, on the display of the computing device, the GUI map feature by overlaying the visual data layer with the map layer.

13. The computing device of claim 12, wherein the visual data layer is a heatmap depicting values of a service parameter of the transport service or the delivery service across the map area to be illustrated by the GUI map feature, wherein the transport service or the delivery service is managed by a network system communicatively coupled to the computing device via one or more networks.

14. The computing device of claim 13, wherein the first and second sets of service data represent values of the service parameter of the transport service or the delivery service.

15. The computing device of claim 13, wherein the service parameter is a price multiplier or a user demand level associated with the transport service or the delivery service.

16. The computing device of claim 12, wherein the one or more image process functions includes a Gaussian blur function and the image processing parameter is a Gaussian blur radius for the Gaussian blur function.

17. The computing device of claim 12, wherein the executed instructions further cause the computing device to, in response to receiving an input to adjust the zoom level of the GUI map feature from an initial zoom level to a desired zoom level, use the bitmap created for the initial zoom level to generate the visual data layer for the desired zoom level.

18. A non-transitory computer-readable medium storing instructions that, when executed by one or more processors of a computing device, cause the computing device to:

determine a set of anchor coordinates for a graphical user interface (GUI) map feature, wherein the GUI map feature comprises a map layer and a visual data layer;

retrieve, based, at least in part, on the set of anchor coordinates, a set of map tiles for generating the map layer and a first set of service data for generating the visual data layer, the first set of service data being data associated with a transport service or a delivery service within a first region corresponding to a map area to be illustrated by the GUI map feature;

dynamically determine an image processing parameter based at least in part on a geographic region within which the first region corresponding to the map area is located and a zoom level of the GUI map feature;

retrieve, based on the image processing parameter, a second set of service data for generating the visual data layer, the second set of service data being data associated with the transport service or the delivery service within a second region corresponding to a buffer area that is not a part of the map area;

generate the visual data layer by creating a bitmap using the first and second sets of service data and performing, based on the image processing parameter, one or more image processing functions on the bitmap, wherein the bitmap includes a first portion corresponding to the map area and a second portion corresponding to the buffer area; and present, on a display of the computing device, the GUI map feature by overlaying the visual data layer with the map layer.

19. The non-transitory computer-readable medium of claim 18, wherein the visual data layer is a heatmap depicting values of a service parameter of the transport service or the delivery service across the map area to be illustrated by the GUI map feature, wherein the transport service or the delivery service is managed by a network system communicatively coupled to the computing device via one or more networks.

20. The non-transitory computer-readable medium of claim 19, wherein the first and second sets of service data represent values of the service parameter of the transport service or the delivery service, the service parameter being a price multiplier or a user demand level associated with the transport service or the delivery service.

* * * * *